(12) United States Patent
Fitzpatrick et al.

(10) Patent No.: US 7,039,677 B2
(45) Date of Patent: May 2, 2006

(54) THREADED TEXT-BASED CHAT COLLABORATION

(75) Inventors: Gregory P. Fitzpatrick, Keller, TX (US); Thomas R. Haynes, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/140,272

(22) Filed: May 7, 2002

(65) Prior Publication Data

US 2003/0212746 A1 Nov. 13, 2003

(51) Int. Cl.
G06F 15/16 (2006.01)

(52) U.S. Cl. ............... 709/204; 715/751; 715/753; 715/758

(58) Field of Classification Search ........ 709/204–206; 715/751, 753–759
See application file for complete search history.

(56) References Cited

U.S. PATENT DOCUMENTS

| | | | |
|---|---|---|---|
| 5,337,407 A | 8/1994 | Bates et al. | 395/153 |
| 5,392,400 A | 2/1995 | Berkowitz et al. | 395/200 |
| 5,581,702 A | 12/1996 | McArdle et al. | 395/200.04 |
| 5,793,365 A * | 8/1998 | Tang et al. | 715/758 |
| 5,819,032 A | 10/1998 | de Vries et al. | 395/200.8 |
| 5,905,863 A | 5/1999 | Knowles et al. | 395/200.36 |
| 5,909,213 A | 6/1999 | Martin | 345/330 |
| 5,949,414 A | 9/1999 | Namikata et al. | 345/332 |
| 5,987,503 A | 11/1999 | Murakami | 709/204 |
| 5,999,208 A | 12/1999 | McNerney et al. | 348/15 |
| 6,014,135 A | 1/2000 | Fernandes | 345/331 |
| 6,014,136 A | 1/2000 | Ogasawara et al. | 345/331 |
| 6,020,884 A | 2/2000 | MacNaughton et al. | 345/329 |
| 6,170,011 B1 | 1/2001 | Macleod Beck et al. | 709/224 |
| 6,195,652 B1 | 2/2001 | Fish | 707/2 |
| 6,212,548 B1 * | 4/2001 | DeSimone et al. | 709/204 |
| 6,219,691 B1 | 4/2001 | Youn | 709/200 |
| 6,345,290 B1 * | 2/2002 | Okada et al. | 709/204 |
| 6,446,112 B1 * | 9/2002 | Bunney et al. | 709/204 |
| 6,559,863 B1 * | 5/2003 | Megiddo | 715/753 |
| 6,691,159 B1 * | 2/2004 | Grewal et al. | 709/219 |
| 6,757,732 B1 * | 6/2004 | Sollee et al. | 709/227 |
| 6,772,195 B1 * | 8/2004 | Hatlelid et al. | 709/204 |
| 6,784,901 B1 * | 8/2004 | Harvey et al. | 715/757 |
| 6,792,448 B1 * | 9/2004 | Smith | 709/204 |
| 6,907,571 B1 * | 6/2005 | Slotznick | 715/758 |
| 6,910,186 B1 * | 6/2005 | Kim | 715/706 |

OTHER PUBLICATIONS

D. LaLiberte, *Live Threaded Chat, Persistent Chat Forums*, <http://hypernews.org/~liberte/threaded-chat.html>, (Aug. 20, 1998).

M. Smith, et al., *Conversation Trees and Threaded Chats*, <http://byronandgen.net/chatandconversation.htm>, (May 23, 2001).

* cited by examiner

*Primary Examiner*—Saleh Najjar
*Assistant Examiner*—Faruk Hamza
(74) *Attorney, Agent, or Firm*—Akerman Senterfitt

(57) ABSTRACT

A method of chat communication can include receiving chat communication messages associated with topical threads and displaying the chat communication messages. The chat communication messages associated with a selected topical thread can be visually distinguished, using a visual identifier, from other ones of the chat communication messages associated with other topical threads.

31 Claims, 2 Drawing Sheets

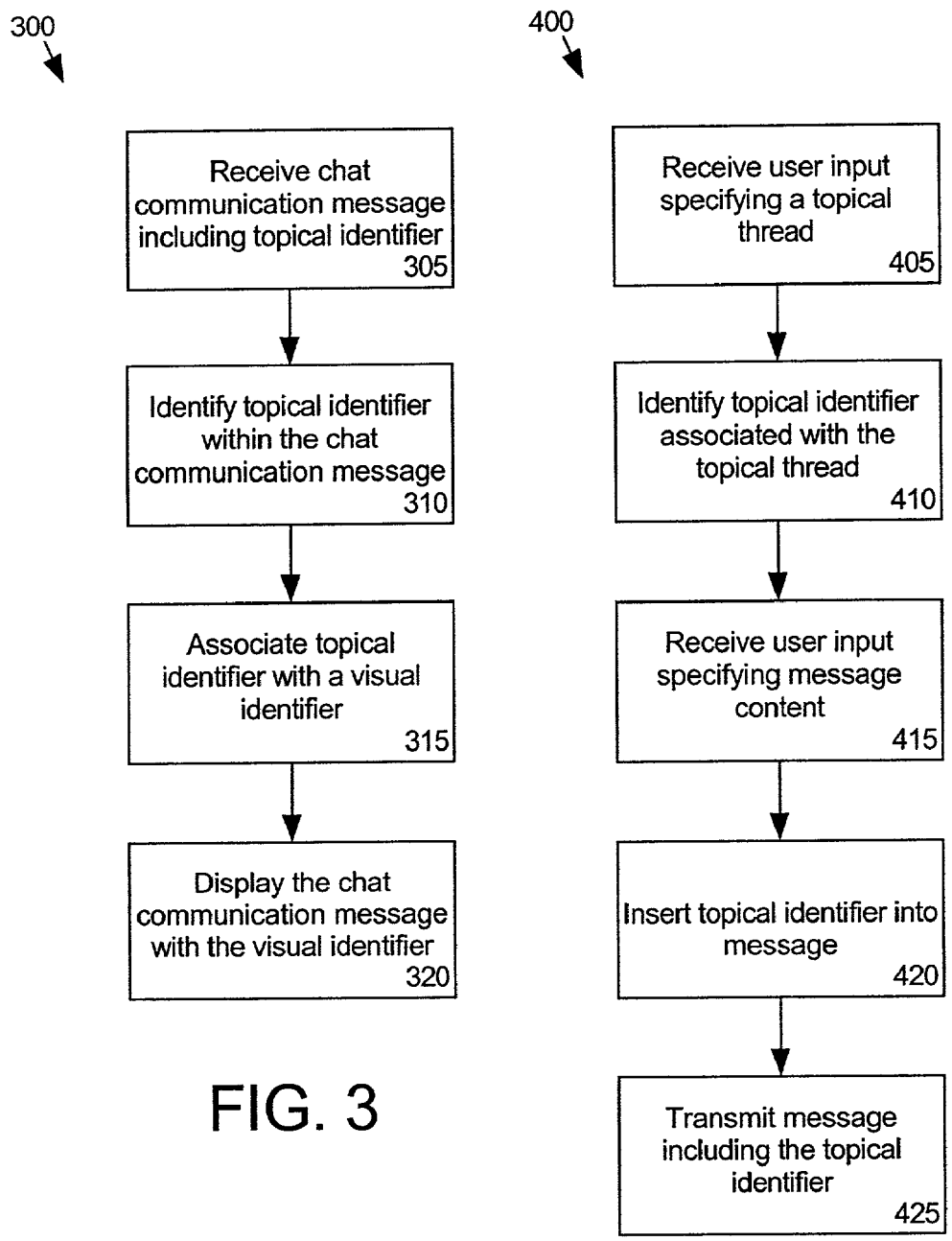

THREADED TEXT-BASED CHAT COLLABORATION

BACKGROUND

1. Technical Field of the Invention

The present invention relates to the field of messaging systems, and more particularly, to Internet chat forums.

2. Description of the Related Art

Internet Relay Chat (IRC), or simply "chat", provides informal real-time communications among users of data network facilities. Chat allows two or more users to converse by exchanging text messages in substantially real-time, typically through a "channel" or virtual "chat room" maintained on one or more chat servers which communicate via the Internet. Chat room conversations are displayed as text in a chat client window on a participant's display screen, usually accompanied by a list of chat participants. The text displayed in the participant's chat client window typically includes a history of the conversation from the time that the viewing participant joined the chat room.

Chat applications are becoming increasingly popular among Internet users. Basic issues with chat client interfaces and the way in which chat text and/or information is presented, however, limit the utility of chat applications for more formal interactions and decision making tasks among users. Standard forms of chat introduce ambiguity into user interactions in a number of ways. The most profound ambiguity is the disruptive nature in which chat messages are displayed within a chat client. Typically, chat messages are displayed in the order in which the chat text messages are received by the chat client. In consequence, listed chat messages do not have any logical ordering that would enable one to easily follow a given conversation. The problem is further exacerbated when a user engages in multiple chat conversations. In that case, chat messages corresponding to any one of several different conversations are posted in the order in which the chat messages are received, thereby making it difficult to follow each individual conversation.

One attempted solution has been to post response chat messages beneath the message to which the chat response is directed. The chat messages can be organized in a hierarchical tree structure. Although this manner of displaying chat messages does clarify query-response interactions among users, also known as turn-taking, displaying messages in a hierarchical tree structure can be cumbersome for a user. In particular, in order to respond to a previous chat message, the user must search through the chat history, locate the particular chat message to which the user wishes to respond, and insert a response beneath the identified chat message. As the chat messages of a particular session frequently extend beyond the viewable portion of a display, the user must scroll throughout what is often a lengthy chat history to locate pertinent chat messages. Moreover, because the newly created chat message response appears within the receiving chat client in the same location of the hierarchical tree structure where the sending user inserted the chat message, the recipient user must constantly scroll through the chat history to detect new chat messages. This can be especially cumbersome where a user wishes to engage in several conversations. In consequence, this approach has been shown to consume valuable time leading to a reduction in levels of user interaction.

Another attempted solution has been to utilize individual windows for each separate chat conversation. Some chat clients allow a new window to be opened for each new conversation. Each window can include its own set of chat conversation participants. Although this approach facilitates the tracking of individual conversations, the multi-window approach suffers from some of the same deficiencies as the hierarchical tree structure approach. Specifically, in order to keep abreast of all of the conversations in which a user is involved, the user must continually scan each of the open chat client windows. Further, a user may be required to undertake several actions before generating a chat message, thereby causing a time lag between the received message and the user's response. For example, if the user wishes to respond to a particular chat message within an inactive chat client window, the user must first select or activate the window and then place the curser within the portion of the window for typing a text message. This can significantly increase the time required for a user to respond to chat messages, especially in cases where the user is actively involved in multiple conversations.

SUMMARY OF THE INVENTION

The invention disclosed herein provides a topically threaded chat communication method and system. In particular, a topically threaded chat session can be provided which includes a sequence of chat communication messages relating to particular topics or subjects. The invention enables participants engaged in a chat session to start new conversational topics and respond to existing conversational topics by associating chat communication messages with various topical identifiers. The topical identifiers can uniquely identify a topical thread, thereby also identifying a particular conversational topic. Each chat message can be visually associated with other chat messages belonging to the same topical thread. Hence, chat communication messages pertaining to specific topics can be easily followed by chat room participants, despite the fact that other chat messages pertaining to other topics are interspersed among the chat messages. The present invention allows chat session participants to organize and multi-task several separate "trains of thought" simultaneously.

One aspect of the present invention includes a method of chat communication. The method can include receiving a chat communication message associated with a topical thread and displaying the chat communication message. A topical identifier can be identified within the chat communication message, wherein the topical identifier corresponds to a selected topical thread. The topical identifier can be associated with a visual identifier. The visual identifier associated with the topical thread can be displayed, for example, at the beginning of the chat communication message. The visual identifier can be a context appropriate visual identifier such as an icon, or a particular text format such as a text color or font style.

Using the visual identifier associated with the selected topical thread, the chat communication message associated with the selected topical thread can be visually distinguished from other ones of the chat communication messages being associated with other topical threads. Notably, the received chat communication message can be displayed within a single window along with the other chat communication messages corresponding to other topical threads. In any case, a chat communication message can be transmitted in response to the received chat communication message. The transmitted chat communication message can be associated with the topical thread of the received chat communication message. According to one embodiment of the present invention, the visual identifier associated with the topical thread can be inserted within the transmitted chat communication message.

Another aspect of the invention can include a method of chat communication including receiving a user input specifying a topical thread, determining a topical identifier associated with the topical thread, inserting the topical identifier within a chat communication message, and transmitting the chat communication message with the topical identifier. One or more user inputs can be received which specify a previous chat communication message which is associated with the topical thread. The topical identifier can be represented as an icon, wherein the icon relates to the topical thread. The visual identifier further can be represented as a particular text format such as a text color or font style.

Another aspect of the present invention can include a chat communication client configured to receive chat communication messages being associated with topical threads, display the chat communication messages within a single window, and, using a visual identifier which corresponds to a selected topical thread, visually distinguish chat communication messages which are associated with the selected topical thread from other ones of the chat communication messages being associated with other topical threads. The chat communication client can include a menu of selectable visual identifiers and a topic field for specifying one of the topical threads. The chat communication client further can be configured to identify a topical identifier within the chat communication message, wherein the topical identifier corresponds to the selected topical thread, and associate the topical identifier with the visual identifier.

Yet another aspect of the present invention can include a chat communication message having a topical identifier, wherein the topical identifier represents a topical thread corresponding to a topic of conversation to which the chat communication message is associated. The chat communication message also can include a visual identifier. The visual identifier can be displayed to a user with the chat communication message and represent the topic of conversation.

BRIEF DESCRIPTION OF THE DRAWINGS

There are shown in the drawings embodiments which are presently preferred, it being understood, however, that the invention is not limited to the precise arrangements and instrumentalities shown.

FIG. 3 is a flow chart showing a method of receiving a topically threaded chat communication message in accordance with the present invention.

FIG. 4 is a flow chart showing a method of sending a topically threaded chat communication message in accordance with the present invention.

DETAILED DESCRIPTION

The invention disclosed herein provides a topically threaded chat communication method and system. In particular, a topically threaded chat session can be provided which includes a sequence of chat communication messages relating to particular topics or subjects. The invention enables participants engaged in a chat session to start new conversational topics and respond to existing conversational topics by associating chat communication messages with various topical identifiers. The topical identifiers can uniquely identify a conversational topic and can uniquely correspond to topical threads in the chat session. Accordingly, chat communication messages pertaining to specific topics can be easily followed by chat room participants, despite the fact the other chat communication messages pertaining to other topics are interspersed among the chat communication messages.

Figure 1:
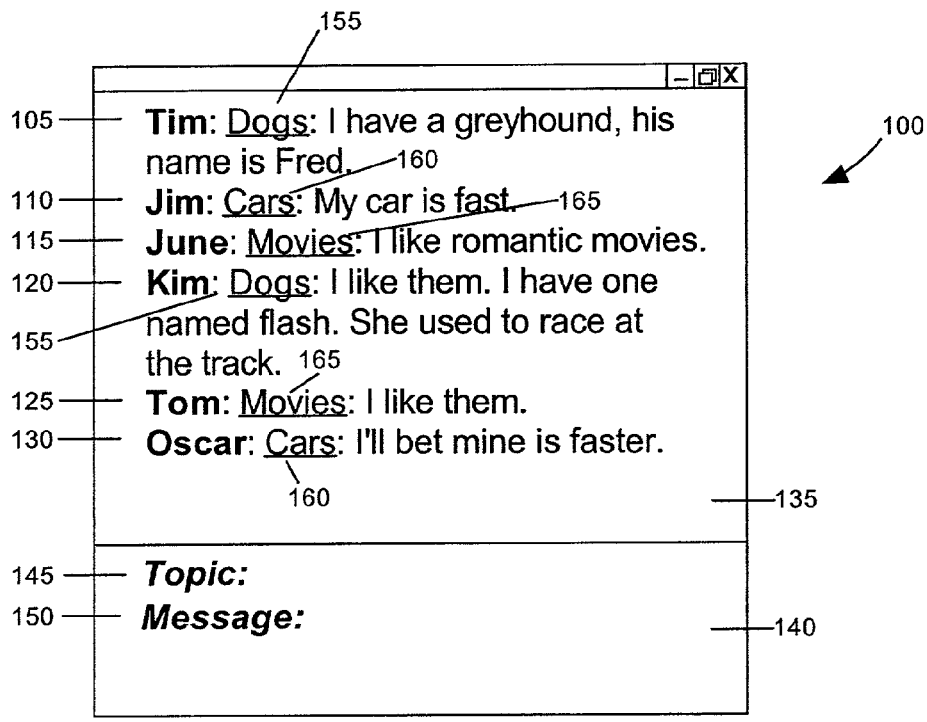
FIG. 1 is a schematic diagram illustrating a user interface window for displaying topically threaded chat communication messages in accordance with the present invention.

FIG. 1 is a pictorial diagram illustrating a chat client user interface window 100 for sending and receiving chat communication messages. The user interface window 100 can include a receive message section 135 and a create message section 140. Received chat communication messages 105, 110, 115, 120, 125, and 130 can be displayed in the receive message section 135. As shown, the received chat communication messages 105–130 can incorporate an identifier which indicates the sender of each chat communication message. Typically, the identifier is a screen name presented prior to the start of the text portion of a chat communication message.

The received chat communication messages 105–130 also can incorporate text-based visual identifiers 155, 160, and 165. The visual identifiers 155–160 can be located just prior to the start of the text portion of a chat communication message. Although the visual identifiers are shown as following the username portion of each chat communication message, the visual identifiers can precede the username portion. Still, the invention is not limited by the placement of the visual identifier. Accordingly, the visual identifier can be located anywhere within a chat communication message to facilitate ease of reading by a user.

The visual identifiers 155–165 serve as an indication of the topical thread to which each chat communication message belongs. For example, a first user identified by a screen name "Tim" can enter chat communication message 105 associated with a topical thread associated with the conversational topic of dogs. The conversational topic and thread can be illustrated visually with the text-based visual identifier "Dogs" 155. A second user identified by the screen name "Kim" can enter a chat communication message 120 in response to chat communication message 105. Notably, as both chat communication messages 105 and 120 correspond to dogs, both can be visually distinguished from other chat communication messages corresponding to other topical threads through the use of the common text-based visual identifier "Dogs" 155. Each message having the text-based visual identifier "Dogs" 155 belongs to the "Dogs" topical thread.

In one arrangement the text-based visual identifiers 155–165 can be presented in the same font as used elsewhere in the chat communication message 105–150. If so, the text-based visual identifiers 155–165 can be identified as such by each visual identifier's placement within the displayed chat communication message. For example, the text-based visual identifier can be located prior to the screen name portion of a chat communication message. In another arrangement the text-based visual identifiers 155–165 can be identified by the formatting applied to the visual identifiers. For example, text-based visual identifiers can be presented using various fonts and visual effects such as underlining, italicizing, bolding, shadowing, and the like. The aforementioned examples, however, are not intended as a limitation on the present invention. Rather, any of a variety of color, font, formatting, text styles, and the like can be applied to the text-based visual identifiers 155–165.

When a new chat communication message is created, a text-based visual identifier can be entered in the topic line 145 of the create message section 140. If a user is responding to a previous chat communication message 105–130, the user can generate the text-based visual identifier 155–160 by selecting the chat communication message to which the user is responding. For example, a user's chat communication message can be associated within the "Dog" topical thread by selecting any of the "Dog" text-based visual identifiers 155 with a pointer. The "Dogs" text-based visual identifier 155 then can be automatically entered into the topic line 145. Alternatively, the user can type or speak the "Dogs" text-based visual identifier 155 into topic line 145.

In another embodiment of the present invention, the visual identifier can be a text format that is applied to the entire text of the chat communication message. In that case, all chat communication messages associated with one topic can share the same visual effect. For example, chat communications messages associated with a first topic can be italicized, while messages associated with a second topic can be bolded. Chat communication messages associated with a third topic can be underlined. When a user wishes to respond to a message, the user can select the body of the message with a pointer thereby causing the response message to be formatted with the same font and/or visual affect that was applied to the message to which the user is responding. Still, it should be appreciated that the visual formatting can be applied to any portion of the chat communication message and need not be applied only to the text portion of the chat communication message. Likewise, a user can select any portion of the chat communication message to generate a response to the chat communication message belonging to the same topical thread, rather than just the visual identifier portion of the chat communication message.

Figure 2:
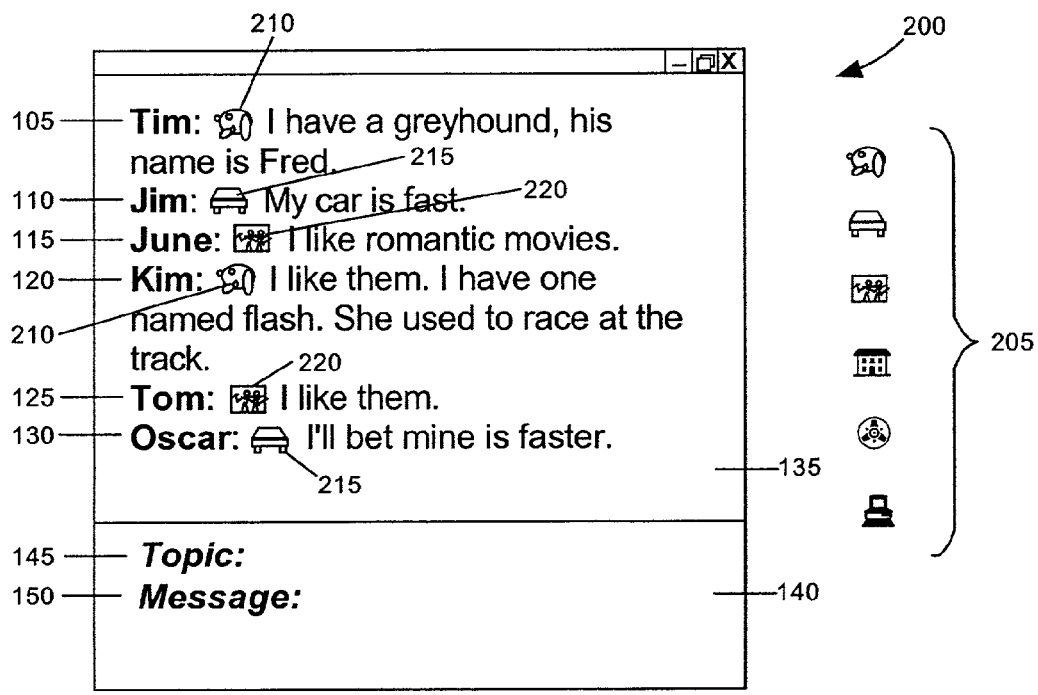
FIG. 2 is a schematic diagram illustrating another user interface window for displaying topically threaded chat communication messages in accordance with the present invention.

FIG. 2 is a pictorial diagram illustrating another user interface window 200 for displaying chat communication messages which incorporate icon visual identifiers. As shown, the chat communication messages 105–130 can be identified by icon visual identifiers 210, 215, and 220. Thus, if the chat communication message 105 is associated with the "Dogs" topical thread, an icon visual identifier 210 representing dogs can be displayed with the chat communication message 105. Visual identifiers, whether text-based or icons, can be selected from a programmed menu of visual identifiers 205. Thus, users can associate a chat communication message with a particular topical thread by inserting text of a text-based visual identifier, by selecting a visual identifier from either a previous message or the menu of visual identifiers 205, or by typing a text label corresponding to an icon visual identifier.

The visual identifiers available for representing topics of conversation (topical threads) can be included within the chat client as programmed default options. In that case, a topical identifier need only be included within each transmitted chat communication message. The topical identifier, which can be included within the header information of a chat communication message, can be matched to a visual identifier associated with the topical thread. Users can be provided access for customizing the visual identifiers. Accordingly, each user can select or design a particular visual identifier corresponding to dogs, for example, such that other users need not utilize the same visual identifier. Moreover, one chat participant could utilize a text-based visual identifier, while another chat participant may prefer icons as visual identifiers.

According to another aspect of the present invention, the visual identifiers themselves can be included within each transmitted chat communication message. In consequence, topical threads can be dynamically created and need not be programmed within a chat client.

FIG. 3 is a flow chart showing a method 300 of receiving a topically threaded chat communication message in accordance with the present invention. The method 300 can begin in a state wherein a chat session has been established, providing a communication link between at least two chat clients. Referring to step 305, a chat communication message and an associated topical identifier can be received in a chat client. The topical identifier, which can be associated with, and uniquely indicate a particular topical thread, can be identified by the chat client as shown in step 310. Referring to step 315, the identified topical identifier can be associated with a visual identifier. The visual identifier may be stored locally with the chat client or at a remote, although accessible, network location. In step 320, the chat communication message can be displayed with the visual identifier.

As mentioned, the chat communication message itself can include the visual identifier. In that case, the chat client can identify the visual identifier from the received chat communication message. The visual identifier can be displayed with the received chat communication message. In any case, the received chat communication message can be displayed within a single window of a chat client such that the displayed chat communication message is visually distinguishable from other chat communication messages corresponding to different topics of conversation.

FIG. 4 is a flow chart showing a method 400 of sending a chat communication message as part of a topical thread in accordance with the present invention. As previously noted, the method 400 can begin in a state wherein a chat session has been established, providing a communication link between at least two chat clients. Referring to step 405, a user input can be received specifying a topical thread. For example, the user input can be text entered into the topic line of the create message section of a chat client window or speech recognized and inserted into the topic line. Alternatively, the user input can be a selection of an icon visual identifier from a previous chat communication message or a visual identifier menu, or a selection of a previous chat communication message, any one of which may represent or be associated with the topic to which the user wishes to associate his or her response.

Referring to step 410, a topical identifier associated with the selected visual identifier can be determined. As shown in step 415, the topical identifier can be inserted into the chat communication message along with the message content of the chat communication message provided by the user. Notably, in the case where the visual identifier is included within the chat communication message, the visual identifier can be inserted into the chat communication message. Referring to step 425, the message, including the topical identifier or the visual identifier, can be transmitted to a chat server for delivery to an intended recipient chat client.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of chat communication comprising:
   receiving a chat communication message associated with a topical thread;
   using an identifier which indicates sender of each chat communication message;
   inserting said identifier prior to start of text of the chat communication message;
   using a icon, visually distinguishing said chat communication message associated with said selected topical thread from other ones of said chat communication messages associated with other topical threads, wherein the icon visually illustrates a conversational topic of the topical thread;
   inserting said icon associated with said topical thread within said transmitted chat communication message, wherein the inserting is located after the identifier and prior to the start of the text of the chat communication message; and
   displaying said identifier followed by said icon at a beginning of said chat communication message.

2. The method of claim 1, said displaying step further comprising:
   displaying said chat communication message and said other ones of said chat communication messages within a single window.

3. The method of claim 2, further comprising:
   transmitting a chat communication message in response to said received chat communication message, wherein said transmitted chat communication message is associated with said topical thread.

4. The method of claim 2, further comprising:
   identifying a topical identifier within said chat communication message, said topical identifier corresponding to said selected topical thread; and
   associating said topical identifier with said visual identifier.

5. The method of claim 4, further comprising:
   displaying said visual identifier as a context appropriate visual identifier.

6. The method of claim 4, further comprising:
   representing said identifiers as a particular text format comprising at least one of a bold font, an italic font, and an underline format, wherein text formatted with one of said particular text formats relates to one of said topical threads.

7. The method of claim 4, further comprising:
   representing said topical identifiers as particular text colors, wherein text formatted with one of said particular text colors relates to one of said topical threads.

8. A method of chat communication comprising:
   receiving a user input from a sender specifying a topical thread;
   using an identifier which indicates the sender of a chat communication message;
   inserting said identifier prior to start the chat communication message;
   determining an icon associated with said topical thread, wherein the icon visually illustrates a conversational topic of the topical thread;
   inserting said icon within the chat communication message, wherein the inserting is located after the identifier and prior to the start of the chat communication message; and
   transmitting said chat communication message with said icon and said identifier.

9. The method of claim 8, said receiving step further comprising:
   receiving a user input specifying a previous chat communication message which is associated with said topical thread.

10. The method of claim 8, further comprising:
    representing said topical identifier as an icon, wherein said icon relates to said topical thread.

11. The method of claim 8, further comprising:
    representing said identifier as a particular text format from a set of a bold font, an italic font, and an underline format, wherein text formatted with said particular text format relates to said topical thread.

12. The method of claim 8, further comprising:
    representing said identifier as a particular text color, wherein text formatted with said particular text color relates to said topical thread.

13. A chat communication client configured to:
    receive chat communication messages being associated with topical threads;
    display said chat communication messages within a single window; and
    visually distinguish chat conunumication messages which are associated with a selected topical thread, using an identifier and an icon pre-appended to the chat communication messages from other ones of said chat communication messages being associated with other topical threads, wherein said icon visually illustrates a conversational topic of the topical thread.

14. The chat communication client of claim 13, further comprising:
    a menu of selectable icons.

15. The chat communication client of claim 14, further comprising:
    a topic field for specifying one of said topical threads.

16. The chat communication client of claim 15, further configured to:
    identify a topical identifier within said chat communication message, said topical identifier corresponding to a topical thread; and
    associate said topical identifier with said icon.

17. A pre-appended chat communication message comprising an identifier and a topical identifier, said identifier presenting a screen name, and said topical identifier visually representing a topical thread corresponding to a topic of conversation to which said chat communication message is associated;

wherein said topical identifier an icon, said icon being displayed to a user with said chat communication message and representing said topic of conversation.

18. A machine-readable storage, having stored thereon a computer program having a plurality of code sections executable by a machine for causing the machine to perform the steps of:
receiving a chat communication message associated with a topical thread;
displaying said chat communication message; and
using an identifier and an icon pre-appended to the chat communication message, visually distinguishing said chat communication message associated with said selected topical thread from other ones of said chat communication messages associated with other topical threads.

19. The machine-readable storage of claim 18, said displaying step further comprising:
displaying said chat communication message and said other ones of said chat communication messages within a single window.

20. The machine-readable storage of claim 19, further comprising:
transmitting a chat communication message in response to said received chat communication message, wherein said transmitted chat communication message is associated with said topical thread.

21. The machine-readable storage of claim 20, further comprising:
inserting said identifier and said icon associated with said topical thread within said transmitted chat communication message.

22. The machine-readable storage of claim 19, further comprising:
identifying a topical identifier within said chat communication message, said topical identifier corresponding to said selected topical thread; and
associating said topical identifier with said icon.

23. The machine-readable storage of claim 22, said visually distinguishing step further comprising:
displaying said visual identifier associated with said topical thread at a beginning of said chat communication message; and
pre-appending an identifier to said chat communication message and prior to start of said icon.

24. The machine-readable storage of claim 23, further comprising:
displaying said icon as a context appropriate visual identifier, wherein the icon visually illustrates a conversational topic of the topical thread.

25. The machine-readable storage of claim 22, further comprising:
representing said topical identifiers as icons.

26. The machine-readable storage of claim 22, further comprising:
representing said visual identifiers as particular text formats from a set of a bold font, an italic font, and an underline format, wherein text formatted with one of said particular text formats relates to one of said topical threads.

27. The machine-readable storage of claim 22, further comprising:
representing said topical identifiers as particular text colors, wherein text formatted with one of said particular text colors relates to one of said topical threads.

28. A machine-readable storage, having stored thereon a computer program having a plurality of code sections executable by a machine for causing the machine to perform the steps of:
receiving a user input specifying a topical thread and an identifier which indicates the sender of a chat communication message;
determining a topical identifier associated with said topical thread;
inserting said identifier and topical identifier with a chat communication message;
transmitting said chat communication message with said identifier and said topical identifier; and
representing the topical identifier as an icon, wherein said icon relates to said topical thread.

29. The machine-readable storage of claim 28, said receiving step further comprising:
receiving a user input specifying a previous chat communication message which is associated with said topical thread.

30. The machine-readable storage of claim 28, further comprising:
representing said visual identifier a particular text format from a set of a bold font, an italic font, and an underline format, wherein text formatted with said particular text format relates to said topical thread.

31. The machine-readable storage of claim 28, further comprising:
representing said icon as a particular text color, wherein text formatted with said particular text color relates to said topical thread.

* * * * *